(12) United States Patent
Krüger et al.

(10) Patent No.: US 12,695,148 B2
(45) Date of Patent: Jul. 28, 2026

(54) SEALING SYSTEM, IN PARTICULAR FOR A BATTERY HOUSING

(71) Applicant: Dr. Ing. h.c. F. Porsche Aktiengesellschaft, Stuttgart (DE)

(72) Inventors: Jens Krüger, Bönnigheim (DE); Jörg Thaler, Stuttgart (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 736 days.

(21) Appl. No.: 18/073,004

(22) Filed: Dec. 1, 2022

(65) Prior Publication Data

US 2023/0187749 A1 Jun. 15, 2023

(30) Foreign Application Priority Data

Dec. 10, 2021 (DE) ...................... 10 2021 132 602.8

(51) Int. Cl.
| | |
|---|---|
| *H01M 50/262* | (2021.01) |
| *B60L 50/64* | (2019.01) |
| *H01M 50/186* | (2021.01) |
| *H01M 50/249* | (2021.01) |
| *H01M 50/258* | (2021.01) |

(52) U.S. Cl.
CPC ........... *H01M 50/262* (2021.01); *B60L 50/64* (2019.02); *H01M 50/249* (2021.01); *H01M 50/258* (2021.01); *H01M 50/186* (2021.01); *H01M 2220/20* (2013.01)

(58) Field of Classification Search
CPC .......................... H01M 50/249; H01M 50/262
See application file for complete search history.

(56) References Cited

U.S. PATENT DOCUMENTS

| | | | |
|---|---|---|---|
| 10,336,211 B2 | 7/2019 | Kobayashi et al. | |
| 2018/0361874 A1* | 12/2018 | Kobayashi | .......... H01M 50/227 |
| 2022/0006150 A1* | 1/2022 | Foran | .................. H01M 50/227 |
| 2023/0163400 A1* | 5/2023 | Hoggarth | ............ H01M 50/209 |
| | | | 429/99 |

FOREIGN PATENT DOCUMENTS

| | | | | |
|---|---|---|---|---|
| DE | 102014102198 A1 | 8/2015 | | |
| DE | 102019220034 A1 | 6/2021 | | |
| EP | 1617111 A1 | 1/2006 | | |
| EP | 3454391 A1 | 3/2019 | | |
| EP | 3821478 B1 * | 6/2022 | .............. B60L 50/64 | |

* cited by examiner

*Primary Examiner* — Susan D Leong
*Assistant Examiner* — Timothy G Hemingway
(74) *Attorney, Agent, or Firm* — Buchanan Ingersoll & Rooney PC

(57) ABSTRACT

A sealing system for a housing includes a first housing part and a second housing part. The first housing part includes a flange, in which a substantially vertically running through-opening is provided. The second housing part includes a fastener receptacle on its outer side, which is separated from its inner side by a wall of the second housing part. A sealing element is arranged between (i) contacting surfaces of the first housing part and the second housing part and (ii) the fastener receptacle. The first housing part rests on the second housing part in such a manner that the through-opening is arranged above the fastener receptacle and a fastener is inserted into the fastener receptacle through the through-opening.

19 Claims, 1 Drawing Sheet

SEALING SYSTEM, IN PARTICULAR FOR A BATTERY HOUSING

CROSS-REFERENCE TO RELATED APPLICATION

This application claim priority to German Patent Application No. 10 2021 132 602.8, filed Dec. 10, 2021, the content of such application being incorporated by reference herein in its entirety.

FIELD OF THE INVENTION

The present invention relates to a sealing system for a housing constructed of at least two parts, in particular for a battery housing of a traction battery of an electric vehicle.

BACKGROUND OF THE INVENTION

A number of battery modules is arranged in a traction battery of an electric vehicle, each having a plurality of battery cells. A monitoring electronics is provided in each cell module, by means of which important parameters of the associated battery cells, for example the temperature and/or the cell voltage, are monitored. The information from the monitoring electronics is collected centrally in a BMC (battery management controller), which assumes central control and monitoring tasks of the traction battery in that, for example, it is responsible for balancing to be performed as needed as well as for determining the state of charge (SOC). Further, the BMC handles communication with the electric vehicle.

To promote a modular construction of the traction battery, the battery cell modules and the BMC can each be arranged in a sub-housing connected to one another, wherein the connection is typically screw-based. In order to provide reliable protection against moisture entry, a sealing washer is provided as an environmental seal, on the one hand, on the head of the screw provided between the housing parts and connecting them to one another. On the other hand, a further environmental seal is provided laterally outward between the housing parts for the screw connection, which seal can take the form of a butyl seal. In addition, a system seal is provided laterally inward between the housing parts for the screw connection, i.e., between the drying region (inner space of the housing) and the screw connection, which seal can also be configured as a butyl seal. The contact surface between the housing parts should be as good and reliable as possible, as it plays an important role for ensuring the EMC (electromagnetic compatibility).

In the structure just described, a disadvantage can be seen in the fact that the screw-based coupling site between the housing parts lies within the sealing region and there is therefore generally an increased susceptibility to leakage. At the same time, the coupling site requires a more complex design and leakage test. With regard to the longevity and durability of the sealing site, a further drawback can be seen in the fact that the laterally outward lying environmental seal is in direct contact with the environment. As a result, it is exposed to potentially corrosive processes, which can be triggered, for example, by a gap corrosion, in which moisture accumulating on the outer side of the seal is drawn to the interior of the screw connection by means of capillary forces and can produce a seal corrosion therein.

U.S. Pat. No. 10,336,211 B2, which is incorporated by reference herein, describes a battery comprising a top housing and a bottom housing forming a battery chamber for receiving a battery. The battery further comprises an upper and a lower housing-side flange, which extends along an outer edge of the upper housing and the lower housing, respectively, wherein the two flanges are opposite one another. A sealing element is arranged between the upper and lower housing-side flanges. The two housing parts are connected to one another by means of a plurality of threaded bolts, each running through the upper housing-side flange and the lower housing-side flange, by means of a corresponding plurality of nuts.

A similar apparatus is known from publication EP 3 454 391 A1, which is incorporated by reference herein, which discloses a fastening structure of a lid body of a battery container. This comprises a container main body, a lid body made of metal, and a corrosion-protective cover material to be applied to the lid body. The lid body is connected to the main body of the container by means of bolts, wherein there is a predetermined gap between these two. The fastening bolt is guided through an opening in the main body of the container and the lid body.

SUMMARY OF THE INVENTION

In light of the aforementioned prior art, described herein is a structurally simpler and at the same time reliable sealing system, which can be used in particular in order to connect housing parts of a traction battery.

According to aspects of the invention, there is provided a sealing system for a housing, in particular a battery housing, such as that of a traction battery. The sealing system can be present at a site of the housing where two housing parts are to be connected to one another in a leak-proof manner. The interconnected housing parts form the housing, whose interior defines a drying region in which electronic or other components can be protected against environmental influences. In addition, the two housing parts mean, in particular, those regions of the two housing parts as a whole (hereinafter referred to as housing shells) which form the mechanical coupling site between the two housing parts. The further configuration of the two housing shells that form the housing can be adapted as needed to the components that are to be located therein and will therefore not be explained in further detail in the context of the description of the present invention.

The sealing system according to aspects of the invention comprises a first housing part, which comprises a flange in which a substantially vertically running through-opening is provided. This can be understood to mean that the direction of extension of the through-opening is arranged substantially perpendicular to the direction of extension of the flange. Further, the sealing system according to aspects of the invention comprises a second housing part, which, on its outer side, comprises a fastening means receptacle, which is separated from its inner side by a wall of the second housing part. Stated another way, the fastening means receptacle is located on the outer side of the corresponding second housing shell, and there is no connection to the inside of the second housing portion, which is turned towards its interior or the dry region when the housing is assembled. This means, in particular, that there is no connection between the interior of the fastening means receptacle and the inner side of the second housing part or the interior bounded by the corresponding first housing shell.

The sealing system according to the present invention further comprises a sealing element, which is arranged between a contact surface of the first housing part with the second housing part and the fastening means receptacle. The contact surface mentioned here can in particular exist between an edge of the first housing part and an outer side of the second housing part, wherein the corresponding part of the outer side of the second housing part functions as a support surface for the first housing part (e.g., for an edge thereof). The sealing element can comprise a butyl seal, for example a strip of butyl material, which is arranged along the edge of the housing portion as a whole.

The sealing system according to aspects of the invention is configured in such a manner that the first housing part rests on the second housing part in such a manner that the through-opening is arranged above the fastening means receptacle and a fastening means is arranged through the through-opening. The fastening means, e.g., a screw, bolt, anchor, pin, post, weld, adhesive, and so forth extends into the fastening means receptacle and provides a fixed connection between the two housing parts. A thread can be arranged on the inner side of the fastening means receptacle.

According to further embodiments of the sealing system according to the present invention, the fastening means receptacle can comprise a hollow bolt, preferably a weld bolt, arranged on the second housing part. As already mentioned, the weld bolt can comprise an internal thread which engages with an external thread arranged on the fastening means. The fastening means receptacle can be present as a separate, integrally formed element and can be attached to the second housing part as a whole after manufacture thereof, for example by welding. Due to the fact that the fastening means receptacle does not necessarily have to be (but can certainly be) an integral part of the second housing part, a detachment and reattachment is possible as part of a correction when incorrectly placed, which makes the manufacturing process of the corresponding housing shells more robust. Regardless of the specific nature of the design of the fastening means receptacle, it can be designed in one piece or integrally.

According to further embodiments of the sealing system according to aspects of the invention, the sealing element can be arranged, when viewed laterally, between the fastening means receptacle and a wall of the first housing part, from which the flange extends. A distance or clearance can be present between the fastening means receptacle and the edge of the sealing element turned thereto.

According to further embodiments of the sealing system according to aspects of the invention, the sealing element can be arranged, when viewed vertically, between a wall of the second housing part and the flange. In this case, the sealing system with its upper surface can abut the bottom side of the flange and, with its bottom side, can abut the surface of the wall of the second housing part.

According to further embodiments of the sealing system according to aspects of the invention, the sealing element can be arranged in a cavity, which is defined by a bottom side of the flange, by an inner side of the fastening means receptacle, and by a part of the wall of the second housing part. The inner side of the fastening means receptacle can be understood to mean the side turned towards the cavity and facing away from the outer environment or not contacting the latter.

According to further embodiments of the sealing system according to aspects of the invention, an upper side of the sealing element can abut a lower side of the flange, and a side of the sealing element can abut the part of the first housing part which abuts the second housing part.

According to further embodiments of the sealing system according to aspects of the invention, in the region between the fastening means receptacle and the sealing element, the second housing part can rise towards the latter. In other words, the second housing part can rise from the fastening means receptacle—for example from its contact site with the second housing part—to the contact surface between an edge of the first housing part and the wall of the second housing part. This embodiment can be advantageous in that no standing water can accumulate at an exposed end of the sealing element, but rather can be transported away therefrom by means of the beveled wall of the second housing part. In doing so, the sealing element can be protected against cleavage corrosion and the impending sealing element corrosion, thereby maintaining its integrity for a long time.

According to further embodiments of the sealing system according to aspects of the invention, the region of the second housing part on which the edge of the first housing part rests can correspond to a plateau, which is raised to at least one side opposite its environment. The one side can coincide with the inclined wall of the second housing portion between the support surface for the first housing portion and the fastening means receptacle.

Furthermore, according to the present invention, a housing is further provided, in particular for a traction battery. The housing comprises a first housing shell and a second housing shell and at least one instance of the sealing system according to aspects of the invention described above, wherein at least a first housing part is arranged on the first housing shell and at least a second housing part is arranged on the second housing shell. The two housing parts form the sealing system according to aspects of the invention described above in pairs and thus seal the housing against its environment.

It goes without saying that the features mentioned above and those yet to be discussed below can be used not only in the respectively specified combination, but also in other combinations or on their own, without leaving the scope of the present invention.

BRIEF DESCRIPTION OF THE DRAWINGS

Further advantages and configurations of the invention will emerge from the entirety of the description and the accompanying drawing.

DETAILED DESCRIPTION OF THE INVENTION

Figure 1:
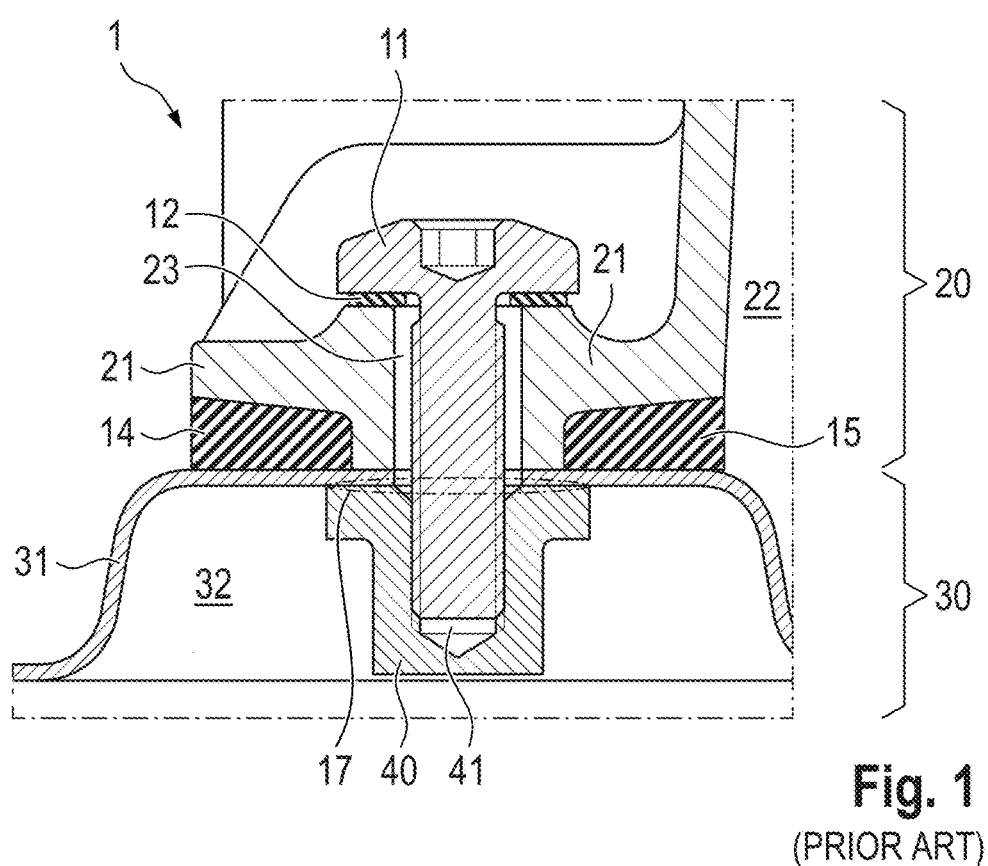
FIG. 1 shows a lateral cross-sectional view of a mechanical coupling site between two housing parts according to the prior art.

FIG. 1 illustrates a schematic cross-sectional view of a mechanical coupling or joining site 1 between two housing parts 20, 30 according to the prior art. In this context, without limiting the generality, a housing shell arranged at the top of the housing 20 belongs to the first housing shell and, analogously, the second housing portion 30 belongs to a housing shell arranged at the bottom. The first housing shell and thus the first housing part 20 correspondingly define an associated first interior 22, which lies on the inner side of the first housing part 20. Analogously, the second housing shell and the second housing part 30 correspondingly define an associated second interior 32, which lies on the inner side of the second housing part 30. The first interior 22 and the second interior 32 can be connected internally or, in other words, open to one another in such a manner that a common interior is present inside the housing.

The mechanical coupling site 1, at which the first housing part 20 and the second housing part 30 are in communication with one another and are secured to one another, is configured here as a screw connection. For this purpose, the first housing part comprises a flange 21, which extends radially outwards from the lower edge of the first housing part 20. A through-opening 23 is formed in the flange 21, which expediently extends vertically through the flange 21. Below the through-opening 23, when the two housing parts 20, 30 are in the merged state, there is a fastening means receptacle 40, which is attached to the bottom of the wall 31 of the second housing part 30. The fastening means receptacle 40 comprises a blind hole 41 having an internal thread, which engages with the external thread of the fastening means 11, which is embodied here as a screw. Consequently, the two housing parts 20, 30 are bolted together in the usual manner. Between the head of the bolt 11 and the entrance into the through-opening 23, a first sealing element 12 is provided in the form of a sealing washer, which corresponds to a first environmental seal and has the task of sealing the through-opening 23 against the environment. This is required, because the support surface of the screw head lies in the wet region and consequently represents a gateway through which moisture could enter the interior of the associated housing.

Furthermore, the contact surface between the bottom of the region of the flange 21 in which the through-opening 23 is located and its support surface on the top side of the second housing part 30 is also sealed against the environment by means of a second sealing element 14. This is typically a polymeric seal, for example made from a synthetic rubber such as butyl. The second sealing element 14 can be configured as a circumferential strip of material. In the context of an overall consideration of the coupling site, the second sealing element can be considered the second environmental seal.

Finally, in principle, in analogy to the second sealing element 14, a third sealing element 15 is provided, which can generally correspond to the second sealing element 14, but is arranged between the interior of the housing and the housing wall. Therefore, the third sealing element 15 fulfills the role of a system seal, as it is, so to speak, within the system, i.e., within the housing.

In the event that the housing is used for electronic components, for example battery modules and/or the associated monitoring and control electronics, electromagnetic compatibility (EMC) plays an important role. To this end, it is important that the first housing part 20 has good contact with the second housing part 30. The corresponding contact surface between the two housing parts 20, 30 is drawn into FIG. 1 as the EMC surface 17. The EMC surface is divided into two parts, namely an inner and an outer EMC surface. In FIG. 1, the inner EMC surface corresponds to the right part of the EMC contact surface 17, and complementary to this, the outer EMC surface corresponds to the left part of the EMC surface 17, wherein the fastening means 11 functions as a separation between the two surfaces.

In the coupling site outlined in FIG. 1 between the two housing parts 20, 30, some disadvantages can be identified. On the one hand, the screw connection of the sealing system 1 lies within the sealing region, which comprises the three sealing elements 12, 14, 15. Thus, the quality of the screw connection directly affects the quality of the seal. Further, the sealing system, which comprises the aforementioned three sealing elements 12, 14, 15, is very fragmented. In addition to the system seal 15 and the second environmental seal 14, the first environmental seal 12 is required. This constitutes an additional component and makes the manufacturing or screw connection process of the first housing part 20 to the second housing part 30 unnecessary. In practice, a moderate two-digit number of screws can be assumed to be necessary for the manufacture of a typical housing for a traction battery (e.g., 40). The housing assembled in this way simultaneously has a corresponding plurality of sealing sites, as a result of which there is an increased susceptibility to leakage. The overall fragmented sealing system also requires a more complex design of both the overall system and the testing for leaks. For example, a leak test of the second sealing element 14 and the third sealing element 15 cannot be performed simultaneously. Finally, the outer edge of the flange 21 does not have an overhang that could function as a protective sealing canopy for the second sealing element 14. In practice, in the screw connection process, the sealing material of the second seal 14 is pushed to the outer side from the gap between the corresponding parts of the bottom of the flange 21 and the top of the wall of the second housing part 30 (more strongly than as shown in FIG. 1) and thereby subjected to even greater external environmental influences. A particularly disadvantageous constellation results when condensation water is deposited on the top side of the second sealing element 14 pushed out of the gap at the outer edge of the flange, which can then cause a permanently corrosive effect.

In addition, it is also disadvantageous that the second sealing element 14 (e.g., butyl seal) is in direct contact with the environment. Consequently, there is the basic risk here that gap corrosion and resulting sealing corrosion will occur. This is a problem not only with regard to tightness; rather, it can also negatively affect the EMC of the housing, as corrosion acting from the environment on the second sealing element 14 as the second environmental seal can also lead to the degradation of the outer EMC surface.

Figure 2:
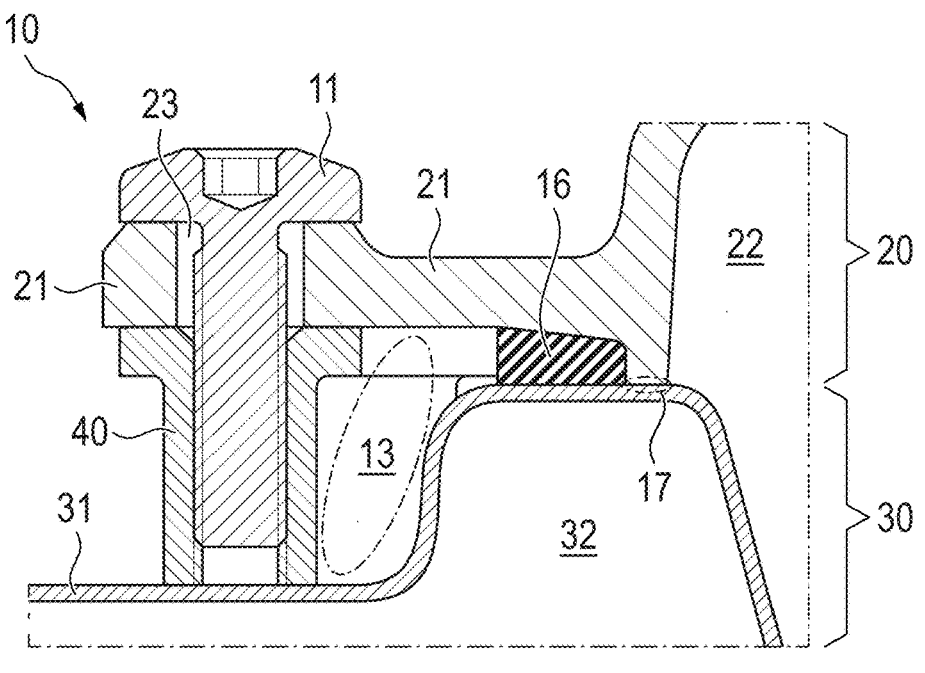
FIG. 2 shows a lateral cross-sectional view of a mechanical coupling site between two housing parts according to aspects of the invention.

In FIG. 2, the sealing system 10 according to aspects of the invention is also illustrated in a cross-sectional view, which corresponds to a targeted structural adjustment of the coupling site 1 known from the prior art with the aim of solving at least some and, in the optimal case, all of the problems mentioned above. The sealing system 10 according to aspects of the invention corresponds functionally to the joining site 1 known from the prior art and illustrated in FIG. 1 between two housing parts 20, 30, which is secured by means of a fastening means 11, wherein the fastening means is inserted into a fastening means receptacle 40 through a through-opening 23 in the flange 21 of the first housing part 20. Because the basic structure of the sealing system 10 according to aspects of the invention is similar to the structure of the sealing coupling site 1 known from the prior art, corresponding components in both figures bear the same reference characters and will not be explained again in the context of FIG. 2, provided they can be configured the same and perform the same function. In the following, only the structural differences that result from the inventive concept of this patent application will be discussed.

Compared to the prior art illustrated in FIG. 1, the sealing system 10 according to aspects of the invention is characterized in that the mechanical fastening site, for example the screw connection based on the fastening means 11 and the fastening means receptacle 40, is located completely outside the actual sealing region, i.e., outside of that region between the two housing parts 20, 30, in which they abut one another closely and which is additionally sealed by means of a sealing element 16. The fastening, i.e., the fastening means receptacle 40 and the fastening means 11 inserted therein, is, on the one hand, outside of the sealing region formed by means of the sealing element 16 and, on the other hand, above all completely outside of the interior of the correspondingly formed housing, which defines the drying region. As shown in FIG. 2, the sealing system 10 according to aspects of the invention makes do with only one sealing element 16, which can in principle be compared to the second sealing element 14 or third sealing element 15 described in connection with the coupling site 1 illustrated in FIG. 1. However, the sealing element 16 constitutes the only sealing element of the sealing system 10 according to aspects of the invention. In particular, the first sealing element 12 of FIG. 1 can be omitted, because the tightness of the mechanical fastening has no direct impact on the tightness of the coupling site between the two housing parts 20, 30—because the fastening means receptacle 40 is attached to the outer side of the second housing part 30 and is separated from its inner side by a wall 31 of the second housing part 30 and thus from the second interior 32.

By eliminating the need for a sealing of the screw connection by means of the first sealing element 12 (see FIG. 1), the robustness and reliability of the sealing system 10 according to aspects of the invention is increased, because this measure reduces the number of sealing interfaces by 33% compared to the prior art illustrated in FIG. 1 and corresponds in absolute terms to the number of mechanical coupling sites used (usually, as already mentioned, a moderate two-digit number). This simplifies the design of the sealing system 10 according to aspects of the invention overall and thus also the manufacture thereof. Leak testing is also simple, because there is only one sealing element 16.

It can further be seen that no standing water can form in the region of the sealing element 16 in the sealing system 10 according to aspects of the invention. This is due to the fact that, on the one hand, the upper edge of the sealing means 16 abuts the bottom of the flange 21, which runs consistently with the fastening means receptacle 40, and, on the other hand, the sealing means 16 is arranged in an externally protected cavity 13, which protects the region of the sealing means 16 against deposits of condensation. Even in the case of a larger resulting butyl seam than, for example, the sealing element 16 used, no standing water can form on its upper edge can form due to the "ceiling" arranged above it in the form of the bottom side of the flange 21, which is larger than the one shown in FIG. 1, extending up to the fastening means receptacle 40. Thus, the sealing system 10 according to aspects of the invention offers, so to speak, a secure retention space for a sealing element 16 which can possibly project further to the fastening means receptacle 40, without this resulting in a disadvantage in terms of the susceptibility to corrosion. This is not the case for the coupling site 1 shown in FIG. 1, because the upper edge of a butyl seam projecting beyond the outer edge of the flange 21 as an exemplary second sealing element 14 acts as a containment channel for standing water and, consequently, undoubtedly increases the susceptibility to corrosion.

Further, the rise of the second housing part 30 in the region between the fastening means receptacle 40 and the sealing element 16 towards the latter ensures that moisture possibly penetrating into the cavity 13 and deposited on the side of the sealing means 16 exposed to the cavity 13 can be removed from the latter into the depression at the foot of the fastening means receptacle 40.

A further advantage of the sealing system 10 according to aspects of the invention is that the EMC surface 17 is arranged in the cavity 13, and its position can thus be associated with the dry region. This allows it to be reliably protected, whereby no time fluctuations are expected in the EMC of the housing configured in this way due to corrosion-related change in the contact surface between the two housing parts 20, 30.

A preferred embodiment is shown in FIG. 2, in which the fastening means receptacle 40 is embodied as a weld bolt and is welded onto the outer side of the second housing portion 30.

For example, a magnetically-assisted remote control (MARC) bolt welding method can be used in order to attach the fastening means receptacle (40) to the outer side of the second housing portion (30). The weld bolt can be made of aluminum, and the second housing part (30) can be made of a thin sheet, also of aluminum.

Overall, by way of the embodiment of the sealing system 10 illustrated in FIG. 2, one can see that, due to the omission of the second sealing element 14 used in the prior art with a comparable sealing system width, this embodiment provides a better environmental protection for components arranged inside than the coupling site 1 illustrated in FIG. 1 according to the prior art.

What is claimed is:

1. A sealing system for a housing, said sealing system comprising:
   a first housing part including a flange and a vertically-running through-opening disposed in the flange;
   a second housing part including a fastener receptacle on an outer side of the second housing part, wherein the fastener receptacle is separated from an inner side of the second housing part by a wall of the second housing part; and
   a sealing element arranged between (i) contacting surfaces of the first and second housing parts and (ii) the fastener receptacle;
   wherein the first housing part rests on the second housing part in such a manner that the through-opening is arranged above the fastener receptacle and a fastener is inserted into the fastener receptacle through the through-opening,
   wherein the fastener receptacle does not protrude through the wall of the second housing part, wherein the sealing element is arranged in a cavity, which is defined by (i) a bottom side of the flange, (ii) an inner side of the fastener receptacle, and (iii) a part of the wall of the second housing part.

2. The sealing system according to claim 1, wherein the fastener receptacle comprises a hollow bolt arranged on the second housing part.

3. The sealing system according to claim 1, wherein the sealing element is arranged, when viewed laterally, between the fastener receptacle and a wall of the first housing part from which the flange extends.

4. The sealing system according to claim 1, wherein the sealing element is arranged, when viewed vertically, between the wall of the second housing part and the flange.

5. The sealing system according to claim 1, wherein a top side of the sealing element abuts a bottom side of the flange of the first housing part, and a bottom side of the sealing element abuts a surface of the second housing part that also abuts the first housing part.

6. The sealing system according to claim 1, wherein, in a region between the fastener receptacle and the sealing element, the second housing portion rises towards the sealing element.

7. The sealing system according to claim 1, wherein a region of the second housing part on which an edge of the first housing part rests corresponds to a plateau, which is raised to at least one side opposite the fastener receptacle.

8. The sealing system according to claim 1, wherein the fastener receptacle comprises a hollow weld bolt arranged on the second housing part.

9. The sealing system according to claim 1, wherein the sealing element is not positioned to surround the fastener receptacle and the fastener.

10. A housing for a traction battery, said housing having a first housing shell, a second housing shell and at least one sealing system according to claim 1, wherein the first housing part is either arranged on or forms part of the first housing shell and the second housing part is either arranged on or forms part of the second housing shell.

11. The housing of claim 10, wherein the sealing element, fastener receptacle and fastener are all arranged outside of an interior region of the housing.

12. A traction battery comprising the housing of claim 10.

13. A vehicle comprising the traction battery of claim 12.

14. The sealing system according to claim 1, wherein the first and second housing parts together define an enclosed interior space that is sealed against the environment, and wherein the sealing element is not disposed within the enclosed interior space.

15. The sealing system according to claim 1, wherein the fastener receptacle is sandwiched between the flange of the first housing part and the wall of the second housing part.

16. The sealing system according to claim 15, wherein an entirety of the fastener receptacle is sandwiched between the flange of the first housing part and the wall of the second housing part.

17. The sealing system according to claim 15, wherein a top side surface of the fastener receptacle is positioned against the flange of the first housing part and a bottom side surface of the fastener receptacle is positioned against the wall of the second housing part.

18. The sealing system according to claim 1, wherein the first and second housing parts together define an enclosed interior space that is sealed against the environment, wherein a wall of the first housing part directly contacts the wall of the second housing part, wherein one lateral side of the wall of the first housing part is disposed within the enclosed interior space, and an opposing lateral side of the wall of the first housing part is positioned in direct contact with the sealing element.

19. The sealing system according to claim 1, wherein a wall of the first housing part contacts the wall of the second housing part, wherein the wall of the first housing part extends vertically from the flange of the first housing part, and wherein the sealing element is positioned in direct contact with (i) a side surface of the wall of the first housing part, (ii) a bottom side surface of the flange of the first housing part and (iii) a top side surface of the wall of the second housing part.

* * * * *